(12) United States Patent
Henry et al.

(10) Patent No.: US 7,761,578 B2
(45) Date of Patent: Jul. 20, 2010

(54) COMMUNICATING IN A VIRTUAL ENVIRONMENT

(75) Inventors: Brian L. Henry, Kirkland, WA (US); Pankaj Garg, Redmond, WA (US); Jeffrey Brian Kinsey, Redmond, WA (US); Benjamin A. Leis, Seattle, WA (US); Parag Chakraborty, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1118 days.

(21) Appl. No.: 11/413,868

(22) Filed: Apr. 28, 2006

(65) Prior Publication Data

US 2007/0253436 A1   Nov. 1, 2007

(51) Int. Cl.
*G06F 15/16* (2006.01)
(52) U.S. Cl. ...................................... 709/227; 709/250
(58) Field of Classification Search ................ 709/250; 710/200
See application file for complete search history.

(56) References Cited

U.S. PATENT DOCUMENTS 7,424,710 B1 *   9/2008  Nelson et al. .................. 718/1
2004/0215858 A1 * 10/2004  Armstrong et al. .......... 710/200
2007/0174850 A1 *  7/2007  El Zur ........................ 719/321

OTHER PUBLICATIONS

Microsoft Chimney Networking Stack:, "Windows Scalable Networking Initiative", Apr. 30, 2004, http://channels.microsoft.com/whdc/device/network/scale.mspx, 2 pages.
Alacritech Corp. Session-Layer Interface Control (SLIC), http://www.alacritech.com/html/tech_review,shtml, ©2000-2006, 3 pages.
"Microsoft Windows Scalable Networking Initiative", Windows Hardware and Driver Central, WinHEC Apr. 13, 2004 Version, 11 pages.

* cited by examiner

*Primary Examiner*—Vivek Srivastava
*Assistant Examiner*—Taylor Elfervig
(74) *Attorney, Agent, or Firm*—Woodcock Washburn LLP

(57) ABSTRACT

A computer system and method for communicating in a virtual environment. The computer system may include a first partition and a virtual service client implemented at a first position in the first partition. The computer system may also include a second partition, and a virtual service provider implemented at a second position in the second partition. The first partition and the second partition may be in operative communication via the virtual service client and the virtual service provider. The first position and the second position may enable the virtual service client and the virtual service provider to reduce processing overhead associated with communicating in the virtual environment by eliminating a processing step, a buffer copy, a software interrupt, and/or a context switch.

17 Claims, 17 Drawing Sheets

COMMUNICATING IN A VIRTUAL ENVIRONMENT

BACKGROUND

Computers include general purpose central processing units (CPUs) that are designed to execute a specific set of system instructions. A group of processors that have similar architecture or design specifications may be considered to be members of the same processor family. Although a group of processors may be in the same family because of their similar architecture and design considerations, processors may vary widely within a family according to their clock speed and other performance parameters.

Computer manufacturers want to maximize their market share by having more rather than fewer applications run on the microprocessor family associated with the computer manufacturers' product line. To expand the number of operating systems (OSs) and application programs that can run on a computer system, a field of technology has developed in which a given computer having one type of CPU, called a host, may include virtualizing software that allows the host computer to virtualize another computer system, called a guest. The host computer may execute an application that may cause one or more host instructions to be called in response to a given guest instruction. Thus, the host computer has the capability to run software designed for its own hardware architecture and software written for computers having unrelated hardware architecture. It may also be possible to use virtualizing software to operate multiple incompatible operating systems concurrently on a single computer system. In this arrangement, although each operating system is incompatible with the other, the virtualizing software may host one of the two operating systems, allowing the otherwise incompatible operating systems to run concurrently on the same computer system.

When a guest computer system is virtualized on a host computer system, the guest computer system may be referred to as a "virtual machine," as the guest computer system exists in the host computer system as a pure software representation of the operation of one specific hardware architecture. The terms emulator, virtual machine, and processor emulation may be used interchangeably to denote the ability to mimic or virtualize the hardware architecture of an entire computer system.

In a typical virtualized environment, multiple virtual machines, or "partitions," may run on top of virtualizing software. This software, in turn, may run on top of hardware. The virtualizing software exposes the hardware in such a fashion that typically allows for a plurality of partitions, each with its own OS, to run on the hardware. Thus, the hardware may be virtualized for the partitions by the virtualizing software. Individual partitions may run disparate OSs, such as Windows, Linux, Solaris, and the like. These OSs may be isolated from each other such that if one OS in a partition crashes it will not affect other OSs in other partitions.

However, there is significant performance overhead associated with allowing for virtualization. The performance overhead may be particularly high in software applications requiring heavy input/output (I/O) workloads (e.g., applications with heavy disk access or network communications). This level of performance overhead may be unacceptable in applications that require maximum processor speed.

One cost associated with allowing for virtualization may be attributed to routing information between partitions. Conventionally, information may be routed between partitions by intercepting hardware traps. This process is typically slow and inefficient because no real hardware is involved. The process may be optimized by defining a software channel, or bus, for more efficient communication between partitions. The software channel improves on trap interception because both ends of the channel are virtual machine aware. However, such a channel may still require an unacceptable level of processor overhead due to duplicative processing in both partitions. This duplicative processing frequently occurs because functionality is often built as a stack of drivers, where only the lowest levels are virtual machine aware. For example, after a request traverses a stack in a client partition and is routed to a host partition, the request often must traverse a similar stack in the host partition in order to fulfill the requested operation. Thus, as information is being routed, it often traverses redundant and/or extraneous components in each partition, thereby increasing the number of processing steps. Furthermore, conventional routing techniques may facilitate other inefficiencies, such as increasing the number of buffer copies, software interrupts and/or context switches that normally occur when routing information between partitions. Therefore, it would be advantageous to provide a system and method for routing information between partitions in a virtualized computing environment without incurring the processor overhead that is typical in such an environment.

SUMMARY

The described embodiments contemplate a computer system and method for communicating in a virtual environment. The computer system may include a first partition, a virtual service client implemented at a first position in the first partition, a second partition, and a virtual service provider implemented at a second position in the second partition. The first partition and the second partition may be in operative communication via the virtual service client and the virtual service provider. The first position and the second position may enable the virtual service client and the virtual service provider, respectively, to reduce processing overhead associated with communicating in the virtual environment by eliminating a processing step, a buffer copy, a software interrupt, and/or a context switch. In one embodiment, the first and second partitions may include network stacks. In another embodiment, the first and second partitions may include storage stacks.

The method may include receiving information at a virtual service client that is implemented at a first position in a first partition, determining whether the information is to be routed to a virtual service provider that is implemented at a second position in a second partition, and routing the information to the virtual service provider in the second partition.

In another embodiment, the method may include receiving first information at a virtual service client that is implemented at a first position in a first partition. The first information may include a request for second information from a second partition. The method may also include determining whether the first information is to be routed to a virtual service provider implemented at a second position in the second partition, routing the first information to the virtual service provider in the second partition, and copying the second information directly from the second partition to a component associated with the first partition. The first position and the second position may enable the virtual service client and the virtual service provider to reduce processing overhead associated with communicating in the virtual environment by eliminating a processing step, a buffer copy, a software interrupt, and/or a context switch.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the invention is not limited to the specific methods and instrumentalities disclosed. In the drawings.

DETAILED DESCRIPTION

The inventive subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Figure 1:
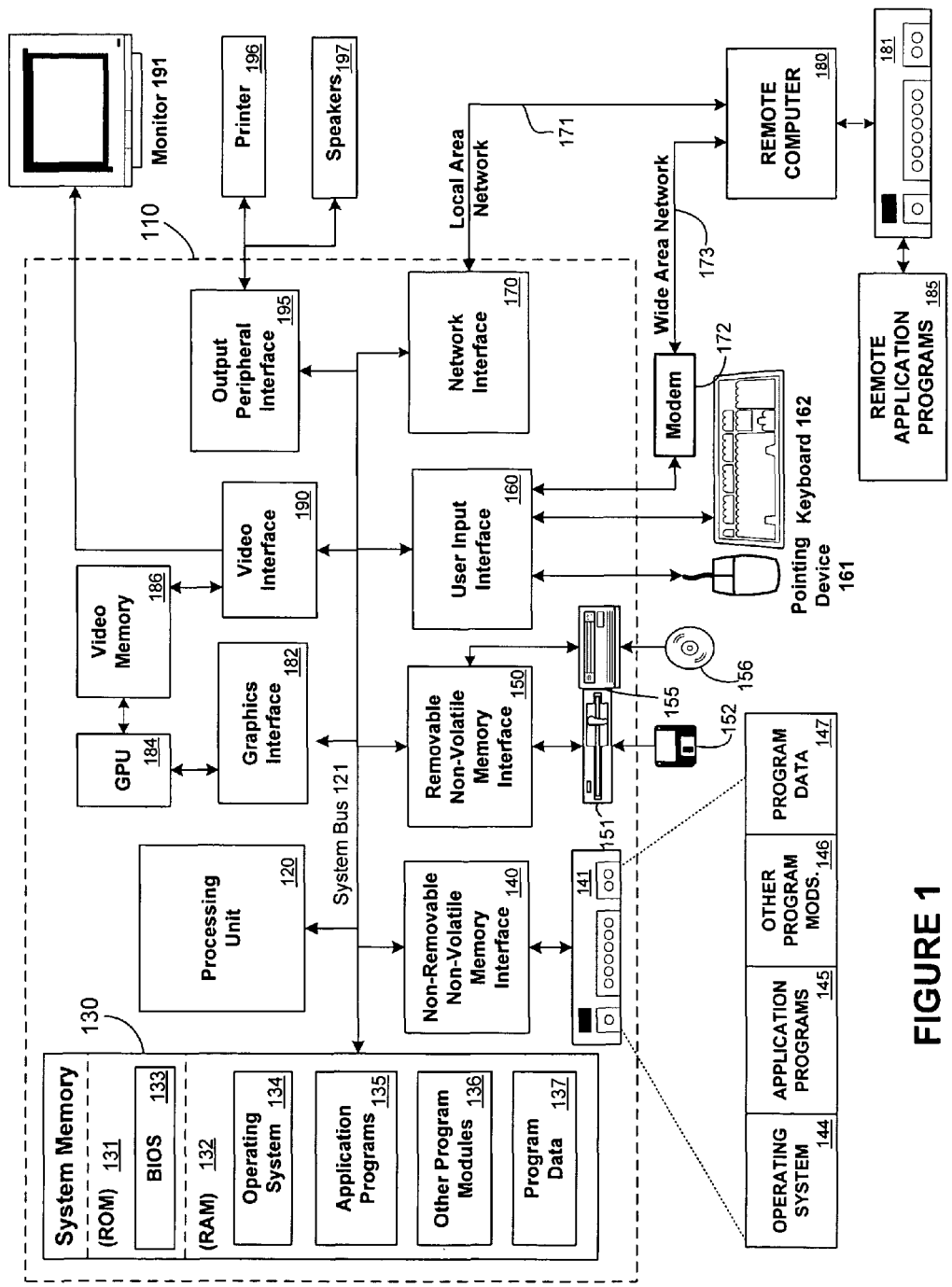
FIG. 1 provides a general description of a suitable computing device.

FIG. 1 and the following discussion are intended to provide a brief general description of a suitable computing device in connection with which the invention may be implemented. For example, any of the client and server computers or devices may take this form. It should be understood, however, that handheld, portable and other computing devices and computing objects of all kinds are contemplated for use in connection with the present invention (i.e., anywhere from which data may be generated, processed, received and/or transmitted in a computing environment). While a general purpose computer is described below, this is but one example, and the invention may be implemented with a thin client having network/bus interoperability and interaction. Thus, the invention may be implemented in an environment of networked hosted services in which very little or minimal client resources are implicated (e.g., a networked environment in which the client device serves merely as an interface to the network/bus, such as an object placed in an appliance). In essence, anywhere that data may be stored or from which data may be retrieved or transmitted to another computer is a desirable, or suitable, environment for operation of the object persistence methods of the invention.

Although not required, the invention may be implemented via an operating system, for use by a developer of services for a device or object, and/or included within application or server software that operates in accordance with the invention. Software may be described in the general context of computer executable instructions, such as program modules, being executed by one or more computers, such as client workstations, servers, or other devices. Generally, program modules may include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand held or laptop devices, multi processor systems, microprocessor based systems, programmable consumer electronics, network PCs, appliances, lights, environmental control elements, minicomputers, mainframe computers, and the like.

FIG. 1 illustrates an example of a suitable computing system environment 100 in which the invention may be implemented, although as made clear above, computing system environment 100 is only one example of a suitable computing environment and is not intended to suggest any limitation as to the scope of use or functionality of the invention. Neither should computing environment 100 be interpreted as having any dependency or requirement relating to any one or combination of components illustrated in exemplary operating environment 100.

As shown in FIG. 1, an exemplary system for implementing the invention includes a general purpose computing device in the form of computer 110. Components of computer 110 may include, but are not limited to, processing unit 120, system memory 130, and system bus 121 that couples various system components including the system memory to processing unit 120. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may include computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above should also be included within the scope of computer readable media.

System memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

Computer 110 may also include other removable/non-removable, volatile/nonvolatile computer storage media. By way of example only, FIG. 1 illustrates hard disk drive 141 that reads from or writes to non-removable, nonvolatile magnetic media, magnetic disk drive 151 that reads from or writes to a removable, nonvolatile magnetic disk 152, and optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 141 is typically connected to system bus 121 through a non-removable memory interface such as interface 140, and magnetic disk drive 151 and optical disk drive 155 are typically connected to system bus 121 by a removable memory interface, such as interface 150.

The drives and their associated computer storage media discussed above and illustrated in FIG. 1 provide storage of computer readable instructions, data structures, program modules and other data for computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into computer 110 through input devices such as keyboard 162 and pointing device 161, such as a mouse, trackball or touch pad. Other input devices (not shown in FIG. 1) may include a microphone, joystick, game pad, satellite dish, scanner, and the like. These and other input devices are often connected to processing unit 120 through a user input interface 160 that is coupled to system bus 121, but may be connected by other interface and bus structures, such as a parallel port, game port, or a universal serial bus (USB). Graphics interface 182 may also be connected to system bus 121. One or more graphics processing units (GPUs) 184 may communicate with graphics interface 182. Monitor 191 or other type of display device is also connected to system bus 121 via an interface, such as video interface 190, which may in turn communicate with video memory 186. In addition to monitor 191, computers may also include other peripheral output devices such as speakers 197 and printer 196, which may be connected through output peripheral interface 195.

Computer 110 may operate in a networked or distributed environment using logical connections to one or more remote computers, such as remote computer 180. Remote computer 180 may be a personal computer, a server, a router, a network PC, a peer device or other common network node, and typically includes many or all of the elements described above relative to computer 110, although only memory storage device 181 has been illustrated in FIG. 1. The logical connections depicted in FIG. 1 include local area network (LAN) 171 and wide area network (WAN) 173, but may also include other networks/buses. Such networking environments are commonplace in homes, offices, enterprise-wide computer networks, intranets and the Internet.

When used in a LAN networking environment, computer 110 may be connected to LAN 171 through a network interface or adapter 170. When used in a WAN networking environment, computer 110 typically includes modem 172 or other means for establishing communications over WAN 173, such as the Internet. Modem 172, which may be internal or external, may be connected to system bus 121 via user input interface 160, or other appropriate mechanism. In a networked environment, program modules depicted relative to computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
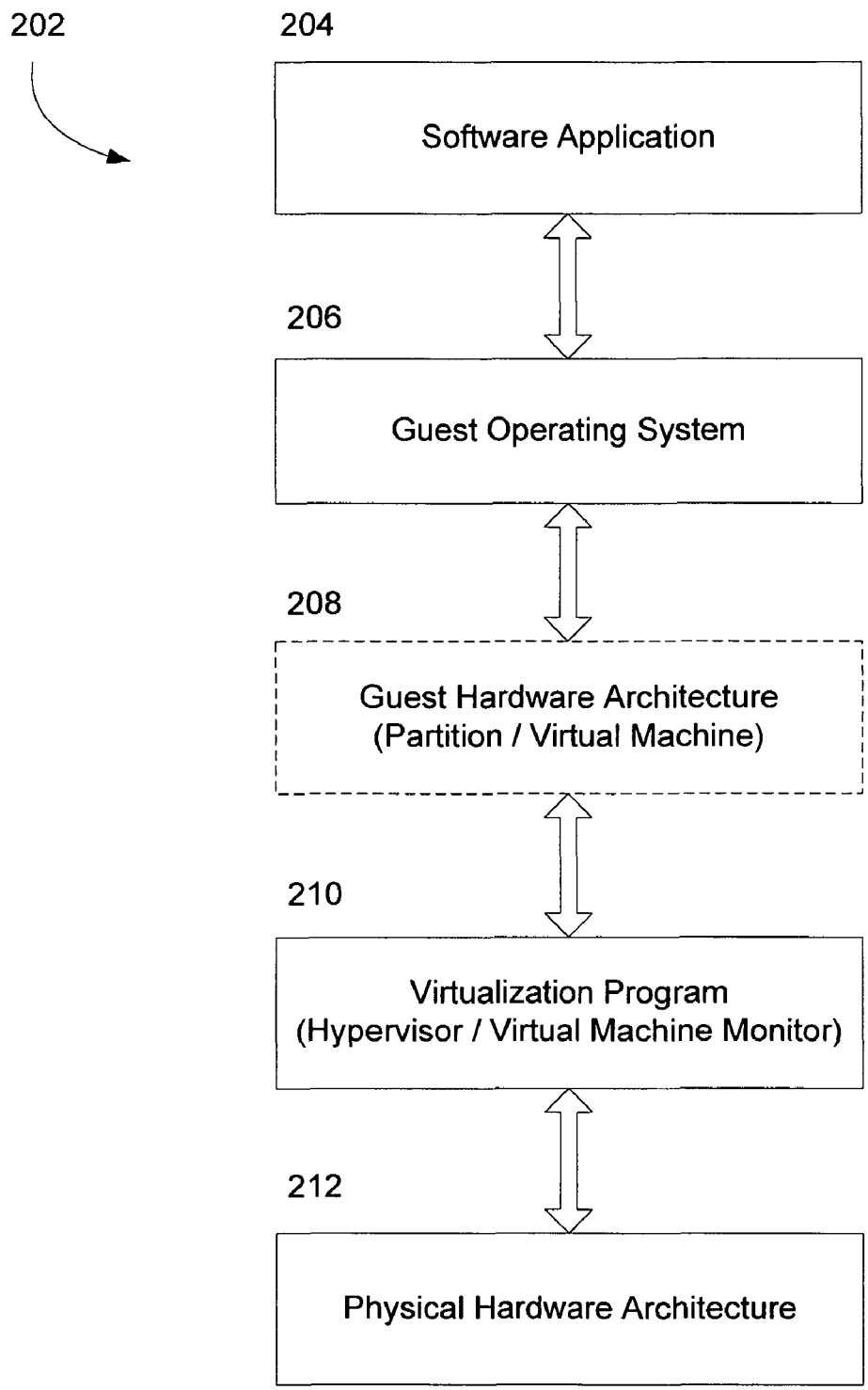
FIG. 2 is a block diagram representing the logical layering of hardware and software architecture for a virtualized operating environment in a computer system.

FIG. 2 is a diagram representing the logical layering of the hardware and software architecture for a virtualized environment in a computer system. As shown in FIG. 2, virtualization program 210 runs directly or indirectly on physical hardware architecture 212. Virtualization program 210 may be a virtual machine monitor (VMM) that runs alongside a host operating system and/or a host operating system with a hypervisor component where the hypervisor component performs the virtualization. Virtualization program 210 may virtualize guest hardware architecture 208 (shown as dashed lines to illustrate the fact that this component is a partition or a "virtual machine"), which may be hardware that does not actually exist but is instead virtualized by virtualizing program 210.

Guest operating system 206 may execute on guest hardware architecture 208, and software application 204 may run on guest operating system 206. In the virtualized operating environment shown in FIG. 2, software application 204 may run in computer system 202 even if software application 204 is designed to run on an operating system that is generally incompatible with a host operating system and hardware architecture 212.

Figure 3A:
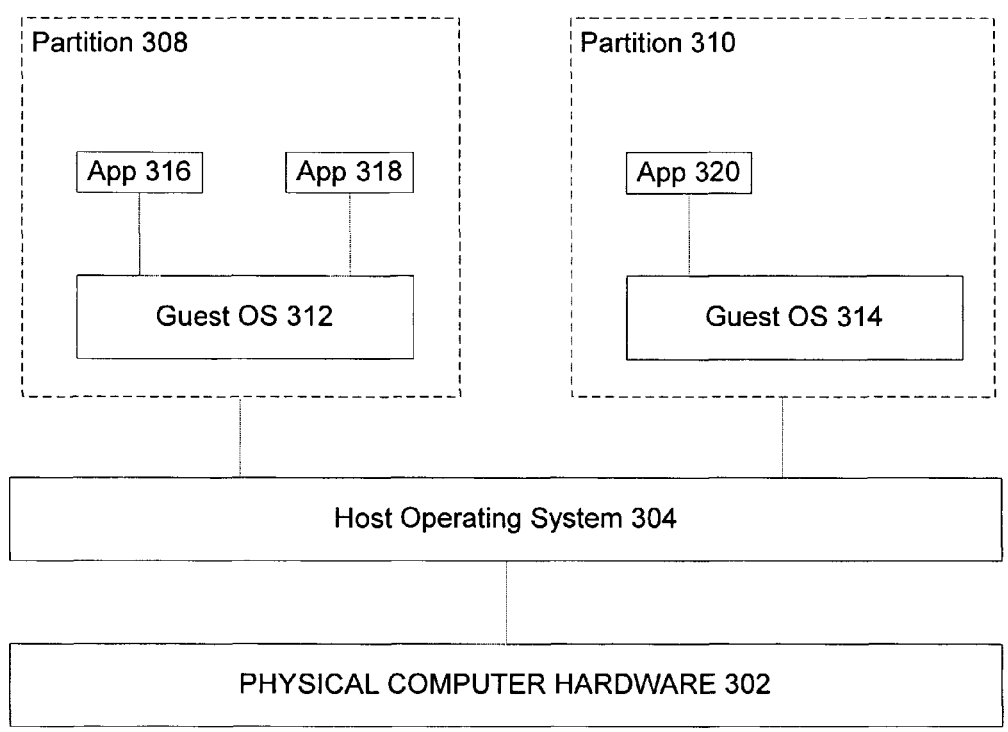
FIG. 3A is a block diagram representing a virtualized computing system wherein the virtualization is performed by a host operating system.

FIG. 3A illustrates a virtualized computing system that may include host operating system (host OS) software layer 304 running directly above physical computer hardware 302, where host OS 304 may provide access to the resources of physical computer hardware 302 by exposing interfaces to partitions 308 and 310 for the use by operating systems 312 and 314, respectively. This enables host OS 304 to go unnoticed by operating system layers 312 and 314 running above it. Again, to perform the virtualization, host OS 304 may be a specially designed operating system with native virtualization capabilities or, alternately, it may be a standard operating system with an incorporated hypervisor component for performing the virtualization (not shown in FIG. 3A).

As shown in FIG. 3A, above host OS 304 are two partitions, partition 308, which may be, for example, a virtualized Intel 386 processor, and partition 310, which may be, for example, a virtualized version of one of the Motorola 680X0 family of processors. Within each partition 308 and 310 there may be two OSs, guest operating systems (guest OSs) 312 and 314, respectively. Running on top of guest OS 312 may be two applications, application 316 and application 318, and running on top of guest OS 314 there may be application 320.

Partition 308 and partition 314 (which are shown in dashed lines) may be virtualized computer hardware representations that exist only as software constructs. They are made possible due to the execution of specialized virtualization software(s) that not only presents partition 308 and partition 310 to guest OS 312 and guest OS 314, respectively, but which may also perform the software steps necessary for guest OS 312 and guest OS 314 to interact with the real physical computer hardware 302.

Figure 3B:
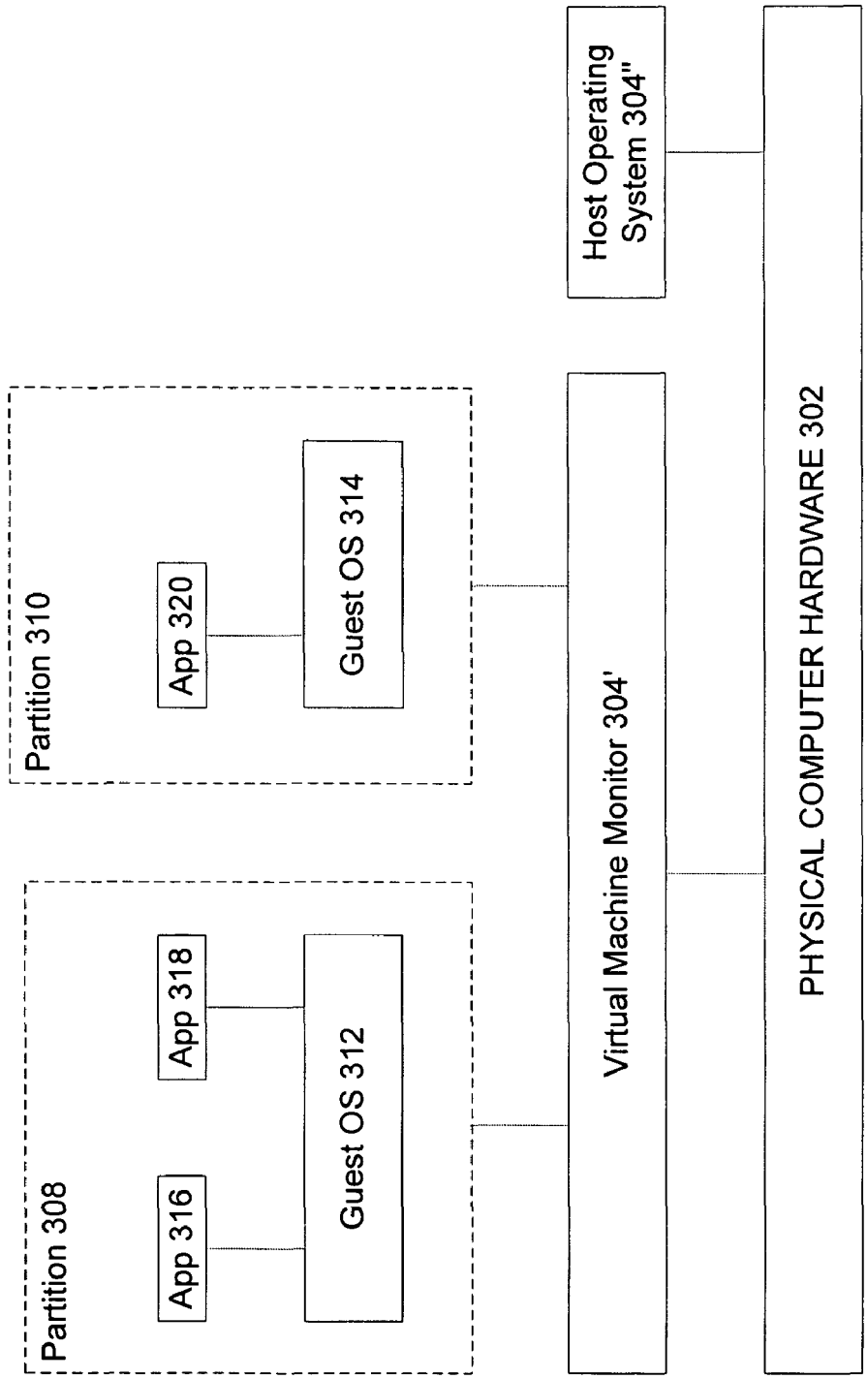
FIG. 3B is a block diagram representing an alternative virtualized computing system, wherein the virtualization is performed by a virtual machine monitor.

FIG. 3B illustrates an alternative virtualized computing system wherein the virtualization is performed by VMM 304' running alongside host operating system 304". In certain cases, VMM 304' may be an application running above host operating system 304" and interacting with computer hardware 302 only through host operating system 304". In other cases, as shown in FIG. 3B, VMM 304' may instead include a partially independent software system that on some levels interacts indirectly with computer hardware 302 via host operating system 304" but on other levels VMM 304' interacts with computer hardware 302 (similar to the way the host operating system interacts with the computer hardware). And yet in other cases, VMM 304' may include a fully independent software system that interacts with computer hardware 302 (similar to the way the host operating system interacts with the computer hardware) without utilizing host operating system 304" (although still interacting with host operating system 304" in order to coordinate use of computer hardware 302 and avoid conflicts and the like).

All of these variations for implementing the above mentioned partitions are just exemplary implementations, and nothing herein should be interpreted as limiting any particular virtualization aspect.

Figure 4:
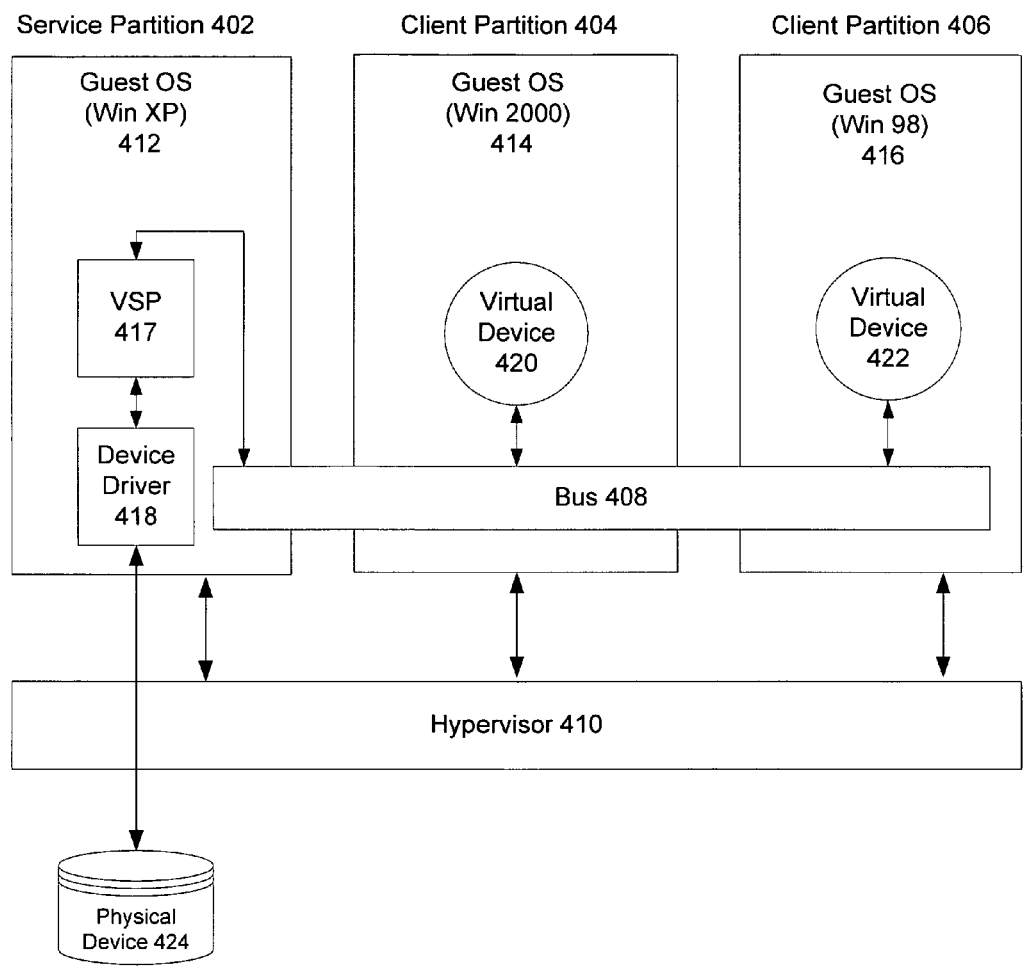
FIG. 4 illustrates a bus for enabling the transfer of data and the sharing of devices between partitions.

FIG. 4 illustrates bus 408 for allowing transfer of data and sharing of devices between partitions. Bus 408 may be a software model of a hardware bus and may allow for formalization of an inter-partition information transfer mechanism. In addition, bus 408 may facilitate the creation of services that allow device sharing and inter—OS integration. Bus 408 may be an information (e.g., requests and/or data) transport mechanism for use between or within partitions in a system with multiple partitions running. However, it is not intended to be the only information transport mechanism available in a virtual machine environment. As such, bus 408 does not have to meet every goal of a client partition in a client partition/service partition relationship. For example, it does not have to be loaded in a NT kernel-mode environment early enough that the hardware abstraction layer (HAL) can use it for initialization. In one embodiment, the bus may rely on a hypervisor inter-process communication (IPC) in order to set itself up, to establish channels of communication between partitions, and/or to inject interrupts into partitions.

As shown in FIG. 4, bus 408 may allow for device sharing and information transport across partitions. Three partitions are depicted, service partition 402 and two client partitions: client partition 404 and client partition 406. These partitions may be maintained by hypervisor 410. Each of these partitions may have an OS, either the same OS as the other partitions or a different one. Thus, service partition 402 may run Windows XP, client partition 404 may run Windows 2000, and client partition 406 may run Windows 98, for example.

Moreover, each of these partitions typically contain at least one device. In particular, service partition 402 may contain device driver 418 for physical device 424. Device driver 418 typically communicates with virtualization service provider (VSP) 417 that allows virtual devices to communicate with physical device 424. Thus, virtual device 420 in client partition 404 and virtual device 422 in client partition 406 may use the services of physical device 424 via bus 408.

Bus 408 may provide a means for client partition 404 and client partition 406 to have access to physical device 424 for use by virtual devices 420 and 422, respectively. Put another way, bus 408 may provide a means for assigning ownership of a device, such as physical device 424, to a single OS, such as Windows XP 412, and then a means of sharing that device's services with other running OSs, such as Windows 2000 414 and Windows 98 416. Additionally, bus 408 may also allow the OSs to move data between partitions, such that data can be easily moved, for example, from service partition 402 to second client partition 406, without involving the traditional hypervisor 410 mechanisms in the information moving transaction.

Figure 5A:
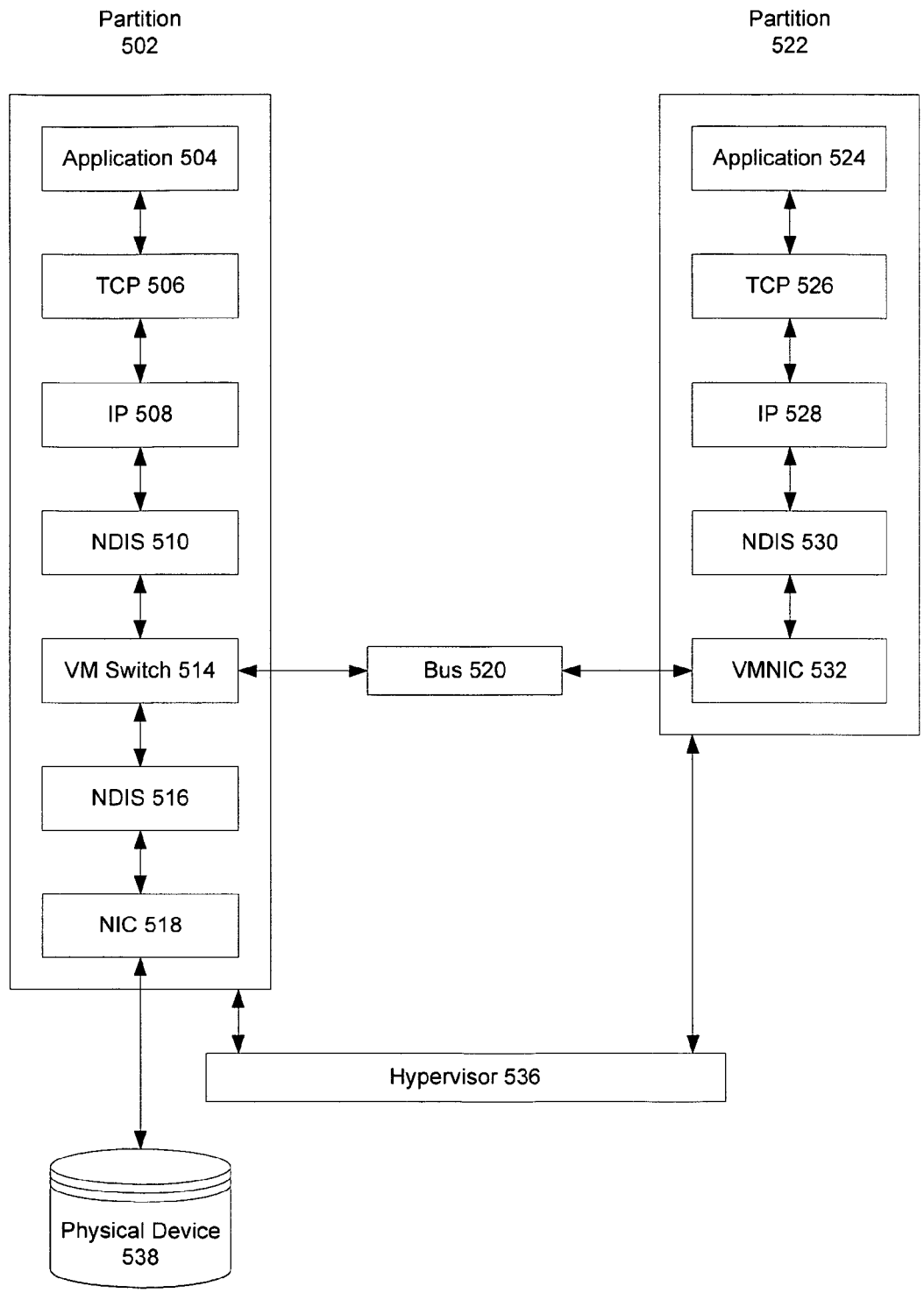
FIGS. 5A illustrates a conventional virtualized computing system for routing information between partitions that include network stacks.

FIG. 5A illustrates a conventional virtualized computing system for routing information between partitions that include network stacks. Two partitions operating in a virtualized environment are depicted, partition 502 and partition 522. Partition 502 may be a provider virtual machine that provides device-related services to partition 522, which may be a client virtual machine. For example, partition 502 may provide all or part of the resources of a physical device 541 to partition 522. Physical device 541 may include any type of physical hardware device, such as a hard disk.

As shown in FIG. 5A, partitions 502 and 522 may each include a network stack, such as a TCP/IP protocol stack, for example. Thus, partitions 502 and 522 may include a number of components that map to the Open Systems Interconnection (OSI) model. Such components may enable information, such as data file requests, to be processed and/or routed through each stack. For example, partition 502 may include application component 504, transport control protocol (TCP) component 506, internet protocol (IP) component 508, network device interface specification (NDIS) component 510, virtual machine (VM) switch component 514, NDIS component 516, and network interface card (NIC) component 518. Physical device 538 may be in communication with NIC component 518.

Partition 522 may include application component 524, TCP component 526, IP component 528, NDIS component 530, and virtual machine network interface card (VMNIC) component 532. Partitions 502 and 522 may run above hypervisor 536 and may be operatively connected via bus 520, which may be in communication with VM switch component 514 and VMNIC component 532 in partitions 502 and 522, respectively. It will be appreciated that partitions 502 and 522 may include other components and/or represent other types of network stacks, such as internetwork packet exchange (IPX), while remaining consistent with an embodiment.

Each component in partitions 502 and 522 may include software instructions for enabling information to be processed and/or routed through each partition. Thus, each component may perform one or more processing steps for preparing the information to be routed to the next component in the partition. In addition, VM switch component 514 and VMNIC component 532 may include software instructions for routing information between partitions 502 and 522, via bus 520. Thus, VM switch component 514, VMNIC component 532 and bus 520 may enable partitions 502 and 522 to share physical device 541. However, this inter-partition device sharing mechanism typically results in higher processing overhead.

For example, application component 524 in partition 522 may be a software application and may generate information that is intended for a component associated with partition 502, such as physical device 538. As shown in FIG. 5A, the information may be routed to VMNIC component 532 via TCP component 526, IP component 528 and NDIS component 530. As the information is being routed to VMNIC component 532, it may be broken into smaller information packets (e.g., 1.5 kb packets). After receiving the information packets, VMNIC component 532 may route the information packets to VM switch component 514 in partition 502 via bus 520. The transfer of multiple information packets to VM switch component 514 via bus 520 may result in multiple inter-partition transitions (i.e., acknowledgments that each information packet was properly sent and/or received). Inter-partition transitions often result in a greater number of software interrupts and/or context switches, which increases processing overhead during inter-partition transfers (e.g., routing information from partition 522 to partition 502).

In addition to generating or sending information, application component 524 in partition 522 may also receive information from a component associated with partition 502, such as physical device 538. For example, application component 524 may request information from physical device 538. The information request may be routed through partition 522, to partition 502, via bus 520. When the information request is received at physical device 538, the information may then be routed to a data buffer (not shown in FIG. 5A) associated with application component 524. As noted above, partition 522 may be a client virtual machine and, therefore, may not be capable of seeing the information being stored in partition 502. Thus, additional buffer copies may be necessary in order to route the information from partition 502 to partition 522.

For example, information that is being routed from physical device 538 to application component 504 in partition 502 may require a single buffer copy at NDIS component 516 before the information is copied into a data buffer associated with application component 504. In contrast, information that is being routed from physical device 538 to application component 524 in partition 522 may require an additional buffer copy at bus 520 before the information is copied into the data buffer associated with application component 524. This additional buffer copy may increase the processing overhead required to route information from partition 502 to partition 522.

Figure 5B:
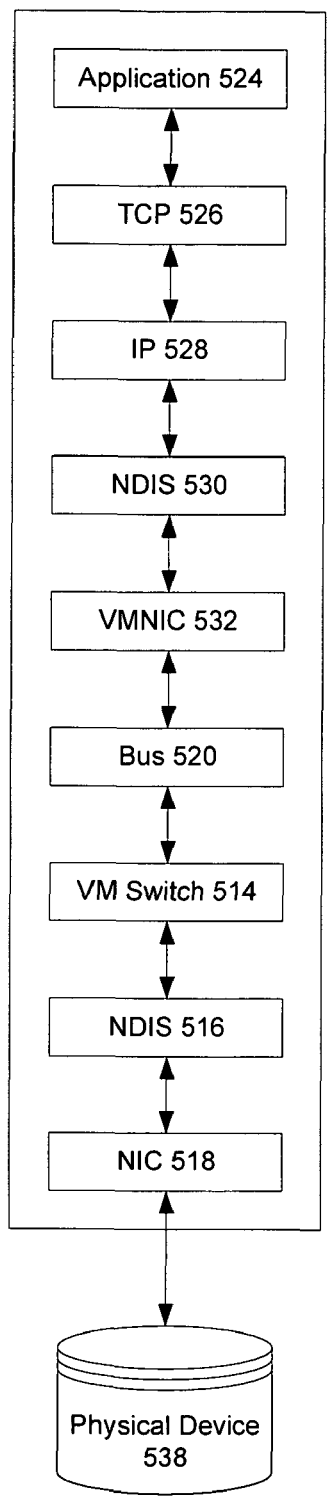
FIG. 5B illustrates an information path between a software application and a physical device that are each associated with the different partitions illustrated in FIG. 5A.

FIG. 5B illustrates the information path between application component 524 and physical device 538 according to the partitions shown in FIG. 5A. As shown in FIG. 5B, the information path between application component 524 and physical device 538 may include TCP component 526, IP component 528, NDIS component 530, VMNIC component 532, bus 520, VM switch component 514, NDIS component 516 and NIC component 518. As noted above, each component may include one or more processing steps for preparing the information to be routed to the next component in the stack. Thus, each component may increase the processing overhead required to route information between partitions 502 and 522.

Figure 5C:
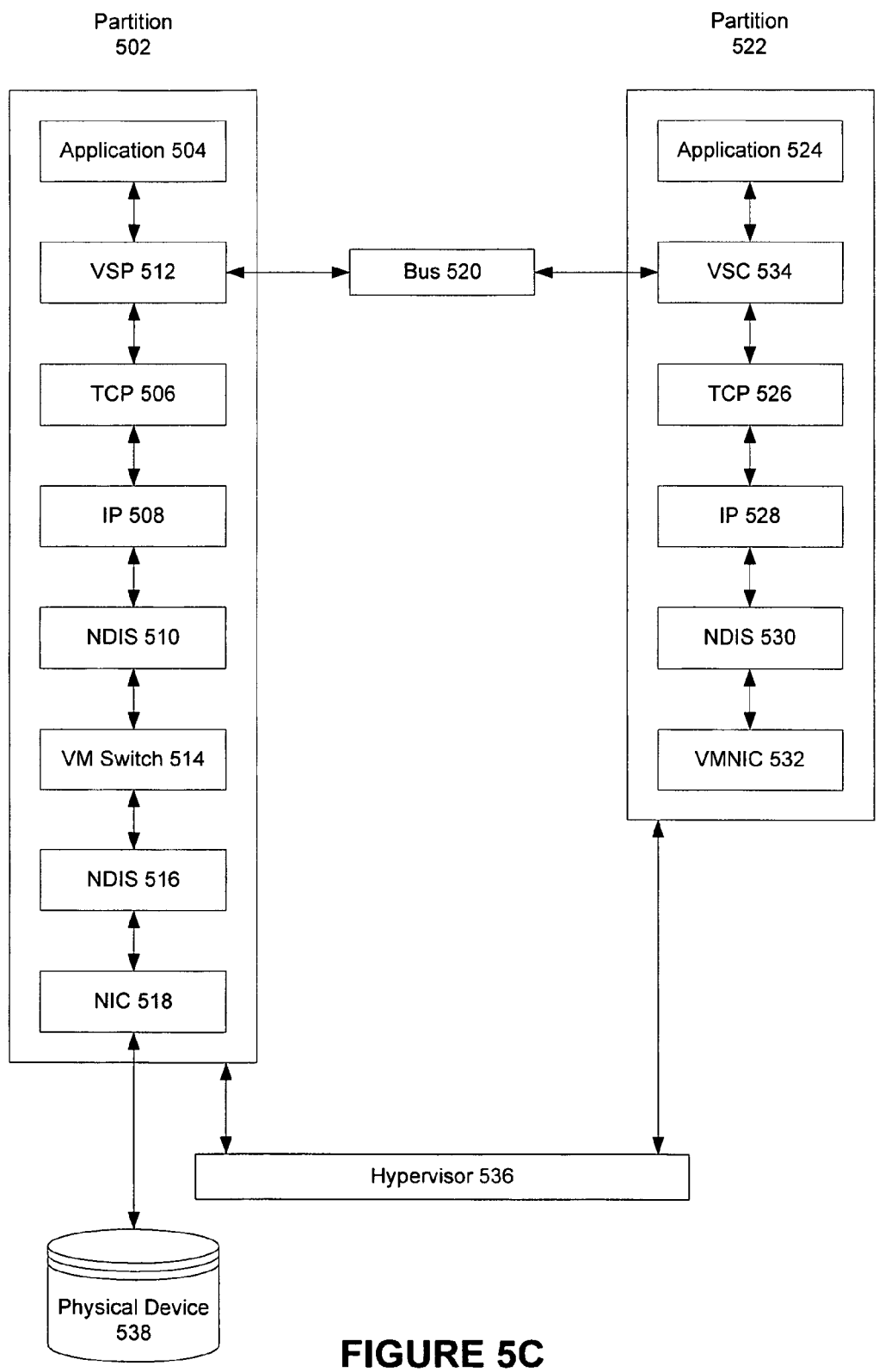
FIG. 5C illustrates a virtualized computing system for routing information between partitions, according to an embodiment.

FIG. 5C illustrates a virtualized computing system for routing information between partitions that include network stacks, according to an embodiment. As shown in FIG. 5C, virtual service provider (VSP) component 512 and virtual service client (VSC) component 534 may be implemented in partitions 502 and 522, respectively. For example, VSP component 512 and VSC component 534 may be implemented above TCP components 506 and 526, respectively. VSP component 512 and VSC component 534 may be operatively connected via bus 520. VSP component 512 and VSC component 534 may include a transport driver interface (TDI) filter, a TDI client, windows filtering platform (WFP) filter, a winsock kernel (WSK) client and the like and may each include software instructions for routing information within partitions 502 and 522, respectively. In addition, VSP component 512 and VSC component 534 may each include software instructions for routing information between partitions 502 and 522 at a relatively higher level in the network stack (e.g., above TCP components 506 and 526). Thus, VSP component 512 and VSC component 534 may be positioned in the stack such that the processing overhead associated with operating in a virtual environment may be reduced.

For example, as noted above, application component 524 in partition 522 may be a software application and may generate information, such as a data file request, that is intended for a component associated with partition 502, such as physical device 538. As shown in FIG. 5C, the information may be received at VSC component 534, which may determine whether the information is to be routed to VSP component 512 in partition 502 or routed within partition 522. If the information is to be routed to VSP component 512, VSC component 534 may route the information to VSP component 512 via bus 520. Otherwise, VSC component 534 may route the information within partition 522 by forwarding the information to TCP component 526. If the information is routed to and received at VSP component 512, the information may then be routed by VSP component 512 through partition 502 as if the information had originated in partition 502 (e.g., the information was generated by application component 504).

As shown in FIG. 5C, VSP component 512 and VSC component 534 may be implemented above TCP components 506 and 526 respectively. Thus, unlike the processing illustrated in FIG. 5A, information that is generated by application component 524 and that is intended for a component associated with partition 502 may not be broken into smaller information packets before it is routed to partition 502 via bus 520. Accordingly, VSC component 534 may be able to route a single packet (e.g., 64 kb or greater) to VSP component 512, thereby reducing the number of inter-partition transitions, which may reduce the number of software interrupts and/or context switches typically incurred when transferring information between partitions in a virtual environment.

As noted above, application component 524 may also receive information from a component associated with partition 502, such as physical device 538. For example, application component 524 request information from physical device 538. The request may be sent to VSC component 534, which may determine the location of the requested information. The information request from application component 524 may also include the address of a data buffer (not shown in FIG. 5C) associated with application component 524 in which the information is to be copied. If the requested information is located in physical device 538, VSC component 534 may route the information request (which may include the data buffer address) to VSP component 512 via bus 520. The information request may then be routed through partition 502 to physical device 538 as if the request was generated within partition 502 (e.g., was sent by application component 504). The information may then be copied from physical device 538 to either NDIS component 516 or NDIS component 510. In addition, by routing the data buffer address associated with application component 524 to partition 502, the information may be copied from NDIS components 516 or 510 directly to the data buffer associated with application component 524 in partition 522 without a separate buffer copy at bus 520. Thus, the same number of buffer copies may be required regardless of whether the information is copied to a component associated with partition 502 or a component associated with partition 522. Fewer buffer copies may decrease the processing overhead required to route information between partitions.

Figure 5D:
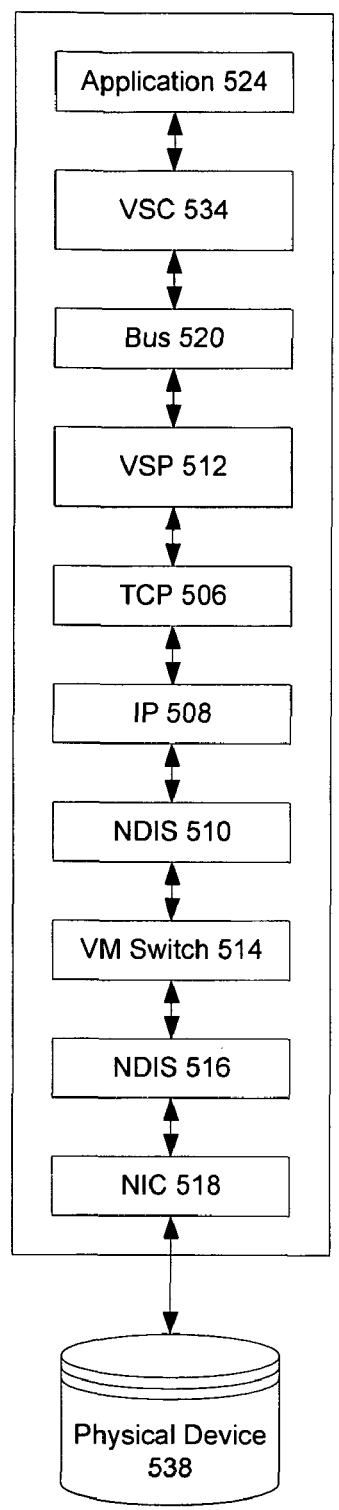
FIG. 5D illustrates an information path between a software application and a physical device that are each associated with the different partitions illustrated in FIG. 5C.

FIG. 5D illustrates the information path between application component 524 and physical device 538 according to the partitions shown in FIG. 5C. As shown in FIG. 5D, the information path between application 524 and physical device 538 may include VSC component 534, bus 520, VSP component 512, TCP component 506, IP component 508, NDIS component 510, VM switch component 514, NDIS component 516, and NIC component 518. Although VM switch component 514 and NDIS component 516 are depicted in FIG. 5D, it will be appreciated that one or both components may be removed from partition 502. Thus, as information is exchanged between application component 524 and physical device 538, fewer processing steps may be required. This may be referred to as "stack compression," which may decrease the processing overhead typically incurred when transferring information between partitions in a virtual environment.

It will be appreciated that VSP component 512 and VSC component 534 may be positioned at any suitable location above TCP components 506 and 526, respectively. For example, VSP component 512 and VSC component 534 may be implemented in the same layer as TCP components 506 and 526 or may be implemented in any suitable higher layer, such as the same layer as application components 504 and 524. It will further be appreciated that VSP component 512 and VSC component 534 may enable information to be routed between any component associated with partition 502 and any component associated with partition 522. For example, VSP component 512 and VSC component 534 may enable information to be routed between application component 504 and application component 524 while remaining consistent with an embodiment.

Figure 6A:
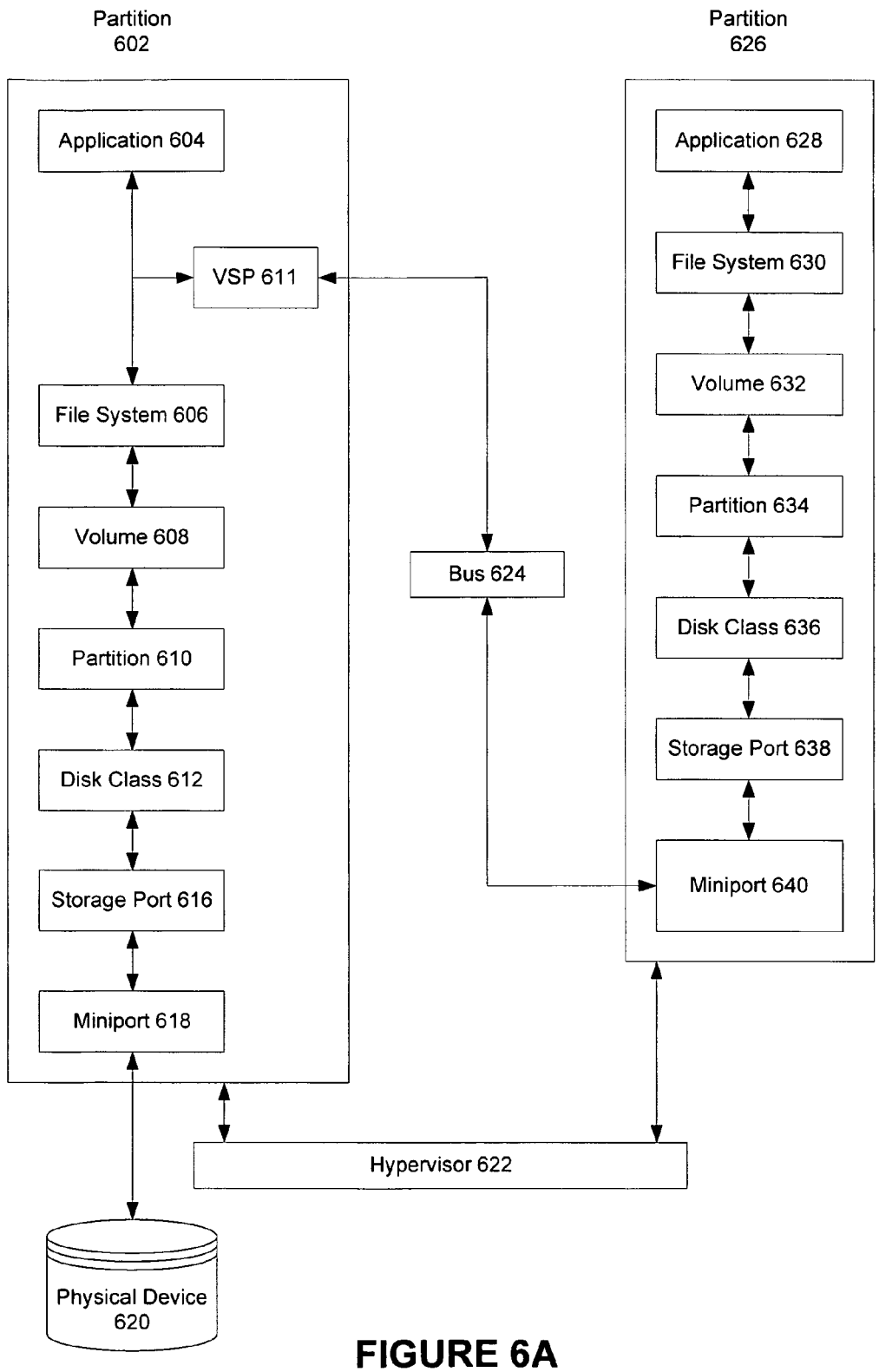
FIG. 6A illustrates a conventional virtualized computing system for routing information between partitions that include storage stacks.

FIG. 6A illustrates a conventional virtualized computing system for routing information between partitions that include storage stacks. Two partitions operating in a virtualized environment are depicted, partition 602 and partition 626. Partition 602 may be a provider virtual machine that provides device-related services to partition 626, which may be a client virtual machine. For example, partition 602 may provide all or part of the resources of physical device 620 to partition 626. Physical device 620 may include any type of physical hardware device, such as a hard disk.

As shown in FIG. 6A, partitions 602 and 626 may each include a storage stack. Thus, partitions 602 and 626 may include of a number of components for processing information, such as data file commands, through each stack. For example, partition 602 may include application component 604, virtual service provider (VSP) component 611, file system component 606, volume component 608, partition component 610, disk class component 612, storage port component 616, and miniport component 618. Physical device 620 may be in communication with miniport component 618.

Partition 626 may include application component 628, file system component 630, volume component 632, partition component 634, disk class component 636, storage port component 638, and miniport component 640. Partitions 602 and 626 may run above hypervisor 622 and may be operatively connected via bus 624, which may be in communication with VSP component 611 and miniport component 640 in partitions 602 and 626, respectively. It will be appreciated that partitions 602 and 626 may include other components and/or represent other types of storage stacks while remaining consistent with an embodiment.

Each component in partitions 602 and 626 may include software instructions for processing and/or routing information within the partitions. Thus, each component may perform one or more processing steps for preparing the information to be routed to the next component in the partition. In addition, VSP component 611 and miniport component 640 may include software instructions for routing the information between partitions 602 and 626, via bus 624. Thus, VSP component 611, miniport component 640 and bus 624 may enable partitions 602 and 626 to share physical device 620. However, this inter-partition device sharing mechanism typically results in higher processing overhead.

For example, application component 628 in partition 626 may be a software application and may generate information that is intended for a component associated with partition 602, such as physical device 620. The information may be routed to miniport component 640 via file system component 630, volume component 632, partition component 634, disk class component 636, and storage port component 638. Miniport component 640 may then route the information to VSP component 611, via bus 624. The information may then be routed to physical device 620 as if the information had originated from partition 602 (e.g., the information was generated by application component 604). Thus, the information may be routed to physical device 620 via file system component 606, volume component 608, partition component 610, disk class component 612, storage port component 616, and miniport component 618. Information generated by physical device 620 and intended for application component 626 may be routed through the same path in reverse order.

As noted above, each component in partitions 602 and 626 may include one or more processing steps for processing the information as it is being routed through the partitions. Furthermore, as application component 628 and physical device 620 may be capable of generating and/or receiving different types of information (e.g., different data file commands), each component may include processing steps that are directed to a specific type of information. Thus, as information is being routed, certain components may be extraneous and may process the information by simply forwarding it to the next component in the partition. Nonetheless, this additional processing may increase processing overhead, particularly where the information is of a type that is frequently routed through the stack and/or that is crucial to the performance of the computing system.

In addition, as shown in FIG. 6A, partitions 602 and 626 may include the same or similar components. Thus, as information is routed between application component 628 and physical device 620, it may be processed by the same or similar components. For example, as shown in FIG. 6A, information that is generated by application component 628 may be processed by storage port component 638 and miniport component 640 in partition 626 and by storage port component 616 and miniport component 618 in partition 602. Such processing may be redundant, causing the components to simply forward the information to the next component, which may increase processing overhead by increasing the number of extraneous processing steps.

Figure 6B:
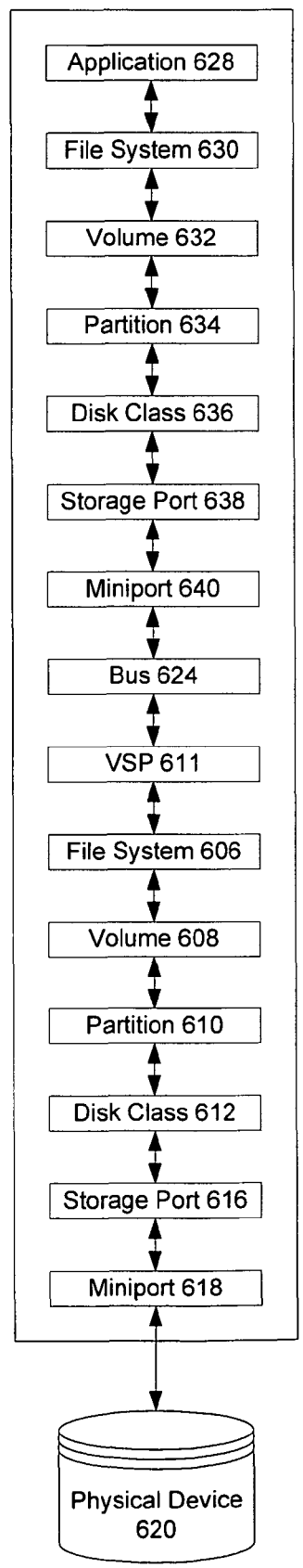
FIG. 6B illustrates an information path between a software application and a physical device that are each associated with the different partitions illustrated in FIG. 6A.

FIG. 6B illustrates the information path between application component 626 and physical device 620 according to the partitions shown in FIG. 6A. As shown in FIG. 6B, the information path between application 626 and physical device 620 may include file system component 630, volume component 632, partition component 634, disk class component 636, storage port component 638, miniport component 640, bus 624, VSP component 611, file system component 606, volume component 608, partition component 610, disk class component 612, storage port component 616, and miniport 618.

Figure 6C:
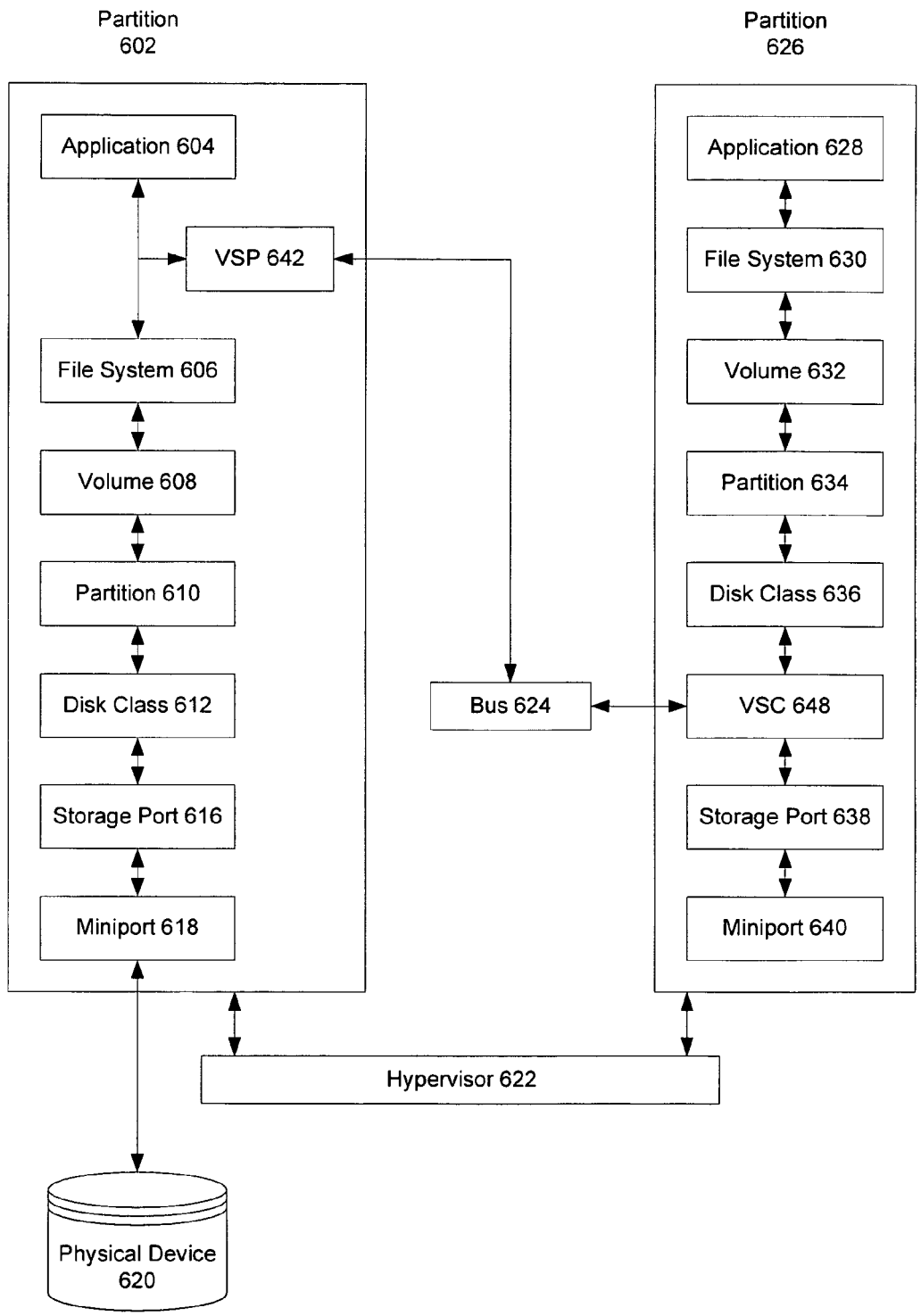
FIG. 6C illustrates a virtualized computing system for routing information between partitions, according to an embodiment.

FIG. 6C illustrates a virtualized computing system for routing information between partitions that include storage stacks, according to an embodiment. As shown in FIG. 6C, VSP component 642 and VSC component 648 may be implemented in partitions 602 and 626, respectively. VSP component 642 and VSC component 648 may be implemented above storage port components 616 and 638, respectively. For example, VSP component 642 may be in communication with file system component 606 and/or application component 604. VSC component 648 may be in communication with storage port component 638 and/or disk class component 636. VSP component 642 and VSC component 648 may be operatively connected via bus 624. VSP component 642 and VSC component 648 may include any type of suitable software filter, such as a windows filtering platform (WFP) filter, and may each include software instructions for processing and/or routing information within partitions 602 and 626, respectively. In addition, VSP component 642 and VSC component 648 may each include software instructions for routing information between partitions 602 and 626 at suitable positions above storage port components 616 and 638. Thus, VSP component 642 and VSC component 648 may be positioned in the storage stack such that the processing overhead associated with operating in a virtual environment may be reduced.

For example, as noted above, application component 628 in partition 626 may be a software application and may generate information (e.g., a read or write command) that is intended for a component associated with partition 602, such as physical device 620. As shown in FIG. 6C, the information may be routed to VSC component 648 via file system component 630, volume component 632, partition component 634, and disk class component 636. VSC component 648 may determine whether the information is to be routed to VSP component 642 in partition 602 or routed within partition 626. If the information is to be routed to VSP component 642, VSC component 648 may route the information to VSP component 642 via bus 624, bypassing storage port component 638 and miniport component 640. Otherwise, VSC component 648 may route the information within partition 626 by forwarding the information to storage port component 638.

If the information is routed to and received at VSP component 642, the information may then be routed through partition 602 as if the information had originated in partition 602 (e.g., the information was generated by application 604). Thus, the information may be routed to physical device 620 via file system component 606, volume component 608, partition component 610, disk class component 612, storage port component 616, and miniport component 618.

Figure 6D:
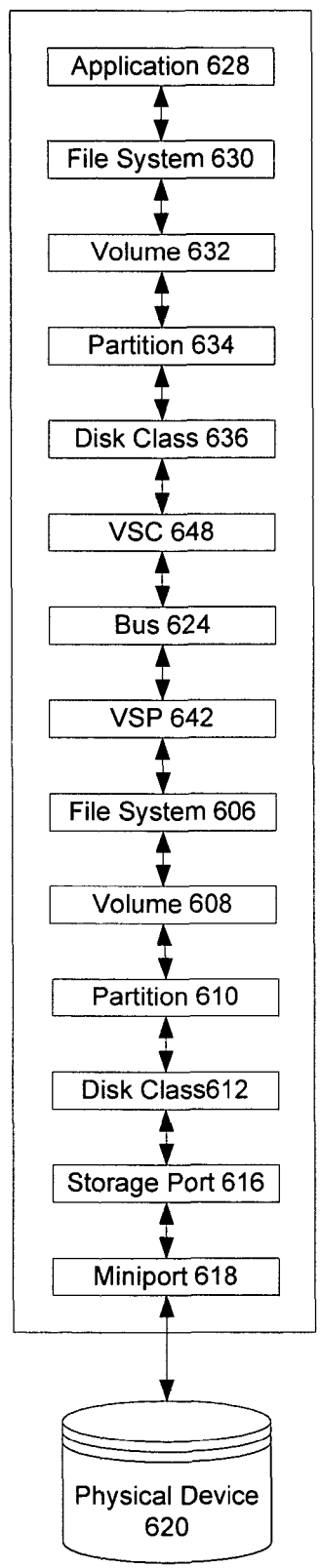
FIG. 6D illustrates an information path between a software application and a physical device that are each associated with the different partitions illustrated in FIG. 6C.

FIG. 6D illustrates the information path between application component 626 and physical device 620 according to the partitions shown in FIG. 6C. As shown in FIG. 6D, the information path between application component 626 and physical device 620 may include file system component 630, volume component 632, partition component 634, disk class component 636, VSC component 648, bus 624, VSP component 642, file system component 606, volume component 608, partition component 610, disk class component 612, storage port component 616, and miniport component 618. As noted above, the information may not be routed through storage port component 638 and miniport component 640 in partition 626. Thus, the number processing steps illustrated in FIG. 6D may be smaller than the number of processing steps illustrated in FIG. 6B. Fewer processing steps may decrease the processing overhead required to route information between application 626 and physical device 620.

Figure 6E:
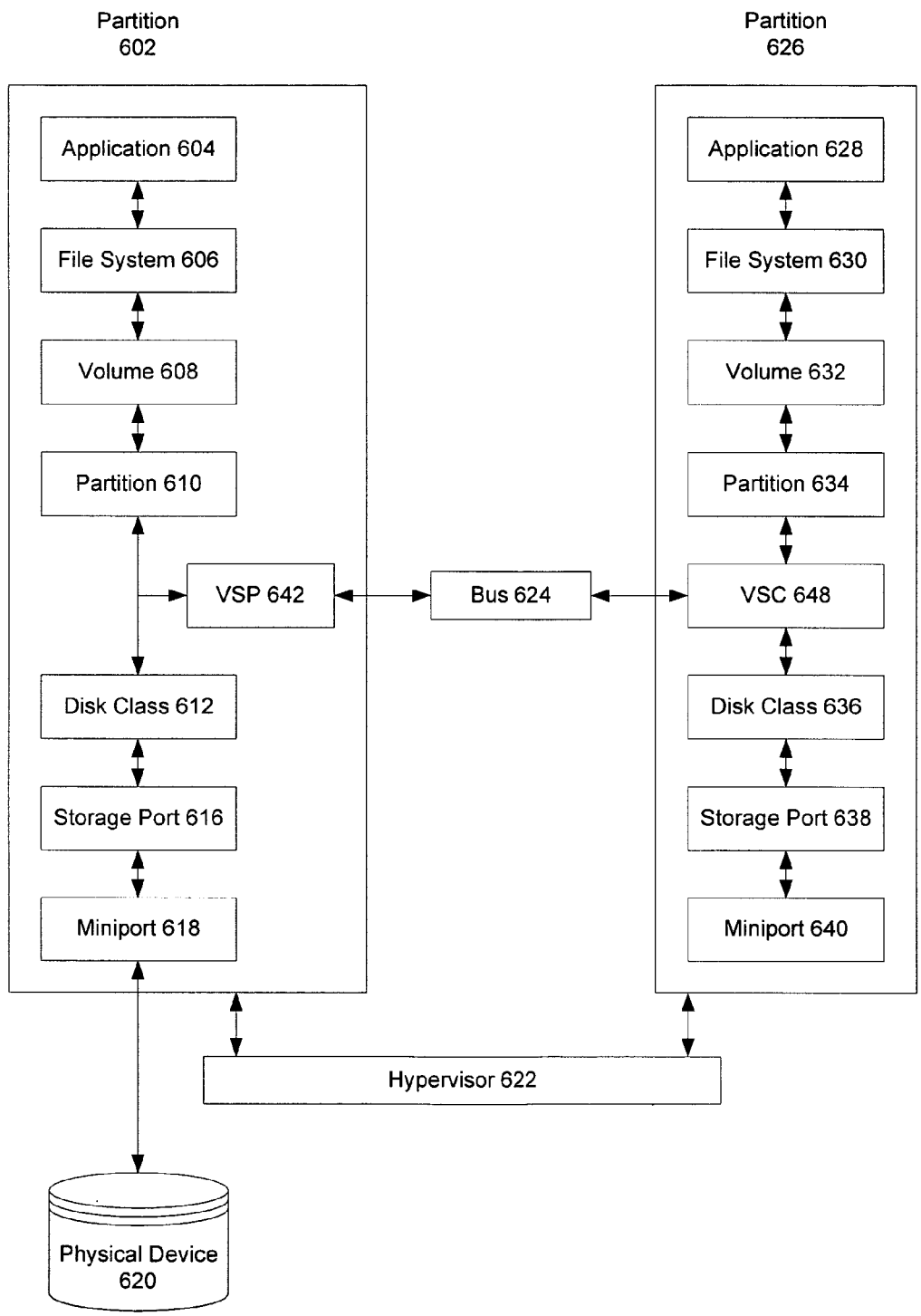
FIG. 6E illustrates a virtualized computing system for routing information between partitions, according to an alternative embodiment.

FIG. 6E illustrates a virtualized computing system for routing information between partitions that include storage stacks, according to an alternative embodiment. As shown in FIG. 6E, VSP component 642 may be in communication with disk class component 612 and/or partition component 610. VSC component 648 may be in communication with partition component 634 and/or disk class component 636. VSP component 642 and VSC component 648 may be operatively connected via bus 624. VSP component 642 and VSC component 648 may each include software instructions for routing information between partitions 602 and 626 at their respective positions above storage port components 616 and 638. Thus, VSP component 642 and VSC component 648 may be positioned in the storage stack such that the processing overhead associated with operating in a virtual environment may be reduced.

For example, application component 628 in partition 626 may generate information (e.g., a read or write command) that is intended for a component associated with partition 602, such as physical device 620. As shown in FIG. 6E, the information may be routed to VSC component 648 via file system component 630, volume component 632, and partition component 634. VSC component 648 may determine whether the information is to be routed to VSP component 642 in partition 602 or routed within partition 626. If the information is to be routed to VSP component 642, VSC component 648 may route the information to VSP component 642 via bus 624, bypassing disk class component 636, storage port component 638 and miniport 640 in partition 626 and bypassing file system component 606, volume component 608, and partition component 610 in partition 602. Otherwise, VSC component 648 may route the information within partition 626 by forwarding the information to disk class component 636.

If the information is routed to and received at VSP component 642, it may then be routed through partition 602 as if the information had originated in partition 602 (e.g., the information was generated by application 604). Thus, the information may be routed to physical device 620 via disk class component 612, storage port component 616, and miniport component 618.

Figure 6F:
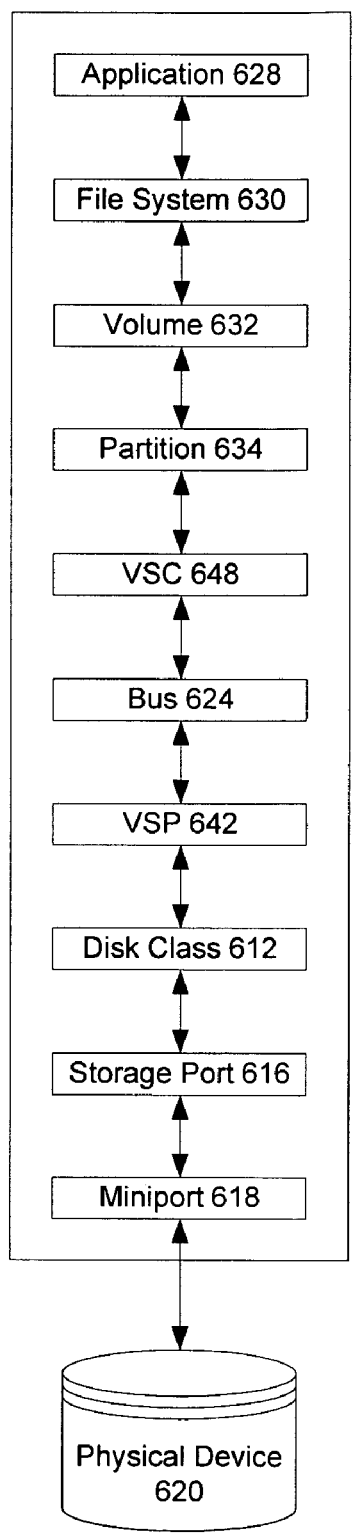
FIG. 6F illustrates an information path between a software application and a physical device that are each associated with the different partitions illustrated in FIG. 6E.

FIG. 6F illustrates the information path between application component 626 and physical device 620 according to the partitions shown in FIG. 6E. As shown in FIG. 6F, the information path between application component 626 and physical device 620 may include file system component 630, volume component 632, partition component 634, VSC component 648, bus 624, VSP component 642, disk class component 612, storage port component 616, and miniport component 618. As noted above, the information may not be routed through disk class component 636, storage port component 638 and miniport component 640 in partition 626 or through file system component 606, volume component 608, and partition component 610 in partition 602. Thus, the number processing steps illustrated in FIG. 6F may be smaller than the number of processing steps illustrated in FIG. 6B. Fewer processing steps may decrease the processing overhead required to route information between application 626 and physical device 620.

Figure 6G:
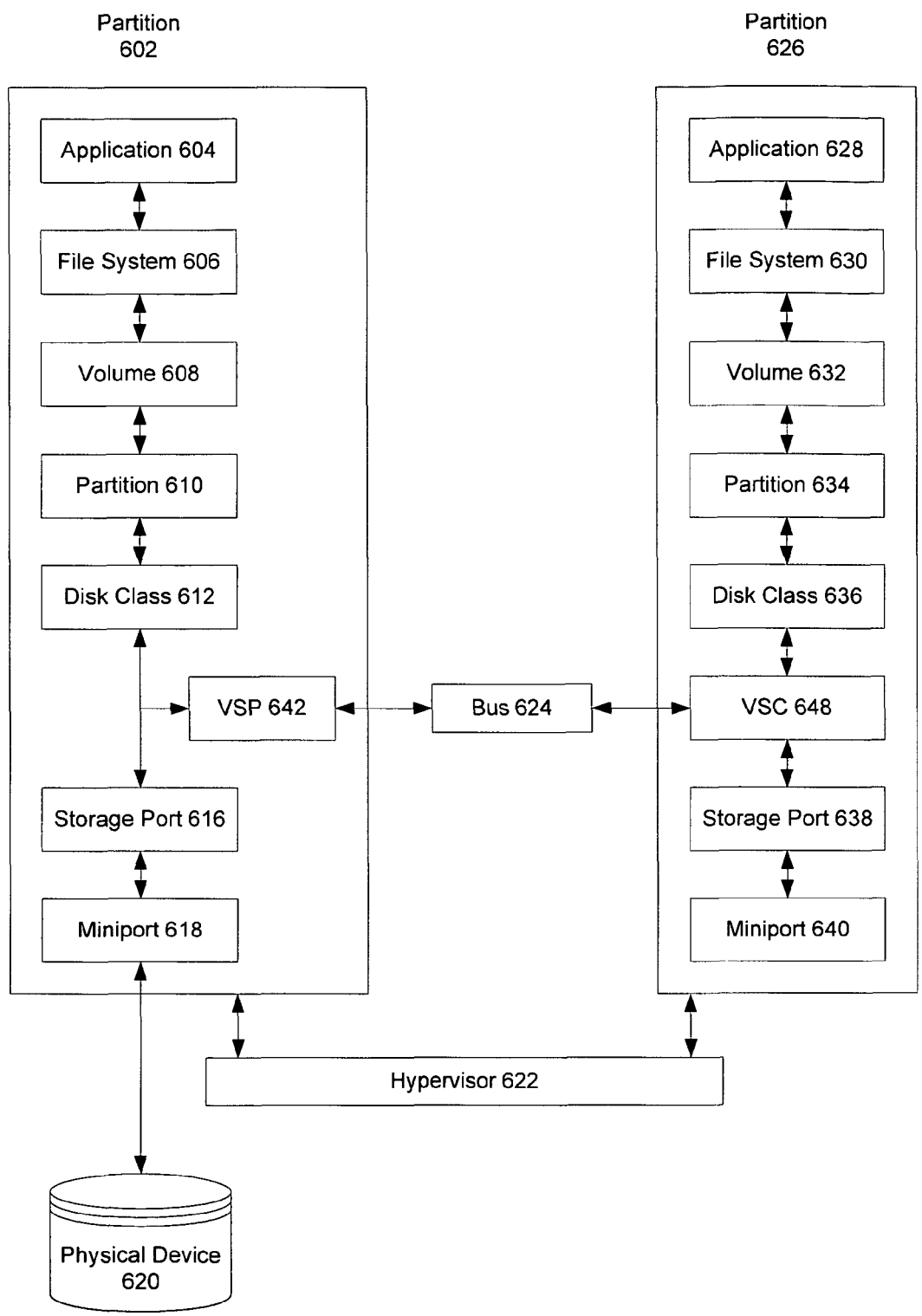
FIG. 6G illustrates a virtualized computing system for routing information between partitions, according to an alternative embodiment.

FIG. 6G illustrates a virtualized computing system for routing information between partitions that include storage stacks, according to another embodiment. As shown in FIG. 6G, VSP component 642 may be in communication with storage port component 616 and/or disk class component 612. VSC component 648 may be in communication with storage port component 638 and/or disk class component 636. VSP component 642 and VSC component 648 may be operatively connected via bus 624. VSP component 642 and VSC component 648 may each include software instructions for routing information between partitions 602 and 626 at their respective positions above storage port components 616 and 638. Thus, VSP component 642 and VSC component 648 may be positioned in the storage stack such that the processing overhead associated with operating in a virtual environment may be reduced.

For example, application component 628 in partition 626 may generate information that is intended for a component associated with partition 602, such as physical device 620. As shown in FIG. 6G, the information may be routed to VSC component 648 via file system component 630, volume component 632, partition component 634, and disk class component 636. VSC component 648 may determine whether the information is to be routed to VSP component 642 in partition 602 or routed within partition 626. If the information is to be routed to VSP component 642, VSC component 648 may route the information to VSP component 642 via bus 624, bypassing storage port component 638 and miniport 640 in partition 626 and bypassing file system component 606, volume component 608, partition component 610, and disk class component 612 in partition 602. Otherwise, VSC component 648 may route the information within partition 626 by forwarding the information to storage port component 638.

If the information is routed to and received at VSP component 642, it may then be routed through partition 602 as if the information had originated in partition 602 (e.g., the information was generated by application 604). Thus, the information may be routed to physical device 620 via storage port component 616 and miniport component 618.

Figure 6H:
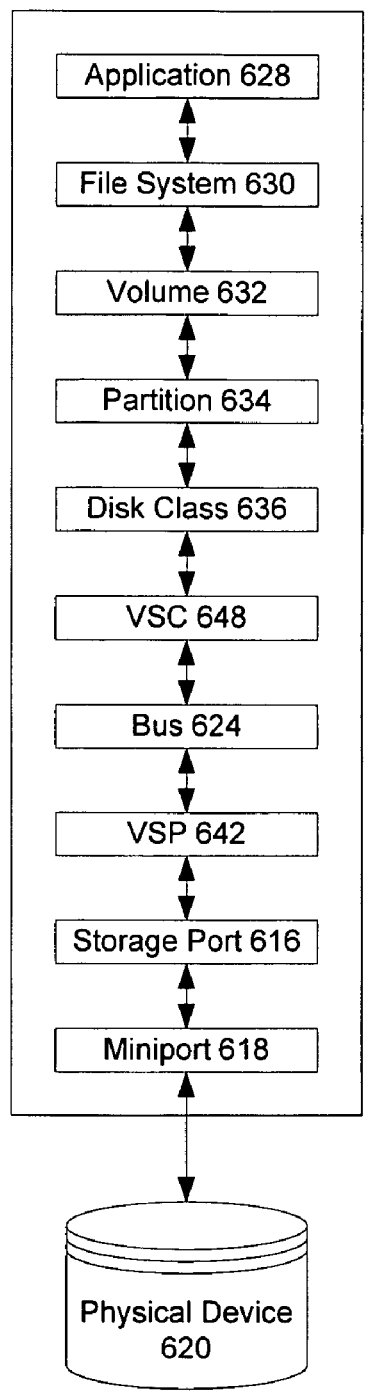
FIG. 6H illustrates an information path between a software application and a physical device that are each associated with the different partitions illustrated in FIG. 6G.

FIG. 6H illustrates the information path between application component 628 and physical device 620 according to the partitions shown in FIG. 6G. As shown in FIG. 6G, the information path between application component 628 and physical device 620 may include file system component 630, volume component 632, partition component 634, disk class component 636, VSC component 648, bus 624, VSP component 642, storage port component 616, and miniport component 618. As noted above, the information may not be routed through storage port component 638 and miniport component 640 in partition 626 or through file system component 606, volume component 608, partition component 610, and disk class component 612 in partition 602. Thus, the number processing steps illustrated in FIG. 6H may be smaller than the number of processing steps illustrated in FIG. 6B. Fewer processing steps may decrease the processing overhead required to route information between application component 628 and physical device 620.

It will be appreciated that VSP component 642 and VSC component 648 may be positioned at any suitable location above storage port components 616 and 638, respectively. For example, VSC component 648 may be in communication with application component 628 and/or file system component 630. It will further be appreciated that VSP component 642 and VSC component 648 may enable information to be routed between other components associated with partitions 602 and 626. For example, VSP component 642 and VSC component 648 may enable information to be routed between application component 604 and application component 626 while remaining consistent with an embodiment. It will also be appreciated that VSP component 642 and VSC component 648 may be implemented at multiple positions in partitions 602 and 626, respectively. For example, VSP component 642 may be in communication with file system component 606, volume component 608, partition component 610, disk class component 612, storage port component 616 and/or miniport component 618.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices. As described in the application, the present invention may apply to any number of existing or emerging computing devices or environments, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly. Likewise, the use of virtual instructions for purposes other than processor virtualization are also anticipated by the disclosures made herein, and any such utilization of virtual instructions in contexts other than processor virtualization should be most broadly read into the disclosures made herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer system for communicating in a virtual environment, comprising:
    a memory having stored thereon computer executable instructions;
    a computer device comprising a processor in communication with said memory when said system is in an operational state wherein said processor executes the computer executable instructions to provide;
    a first virtual machine instantiating a virtual service client in a first partition; and
    a second virtual machine instantiating a virtual service provider in a second partition;
    wherein the first partition and the second partition are in operative communication via the virtual service client and the virtual service provider and wherein the first partition and the second partition comprise a first storage stack and a second storage stack, respectively; and
    wherein the virtual service client is computationally disposed in a first position above a first storage port component in the first storage stack in the first partition in order to communicate with an application program and intercept communication destined for the virtual service provider by way of another software component and routes the communication to the virtual service provider by circumventing the another software component, the virtual service provider computationally disposed in a second position above a second storage port component in the second storage stack in the second partition enable the virtual service client and the virtual service provider, respectively, to reduce processing overhead associated with communicating in the virtual environment.

2. The system of claim 1, wherein the first position and the second position enable the virtual service client and the virtual service provider to reduce processing overhead by eliminating at least one of the following: a processing step, a buffer copy, a software interrupt, and a context switch.

3. The system of claim 1, wherein the first partition and the second partition further comprise a first network stack and a second network stack, respectively, wherein the first position is also above a first TCP component in the first network stack, and wherein the second position is also above a second TCP component in the second network stack.

4. The system of claim 1, wherein the first position is between the first storage port component and a first disk class component in the first storage stack, and wherein the second position is between a file system component and an application component in the second storage stack.

5. The system of claim 1, wherein the first position is between a first partition component and a first disk class component in the first storage stack, and wherein the second position is between a second partition component and a second disk class component in the second storage stack.

6. The system of claim 1, wherein the first position is between the first storage port component and a first disk class component, and wherein the second position is between the second storage port component and a second disk class component in the second storage stack.

7. The system of claim 1, wherein the virtual service client and the virtual service provider are operatively connected via a bus.

8. The system of claim 1, wherein the virtual service client receives a first information, determines whether the first information is to be routed to the virtual service provider in the second partition, and routes the first information to the virtual service provider in the second partition.

9. The system of claim 8, wherein the first information is received at the virtual service provider as a single information packet, and wherein the virtual service provider routes the first information to a first component associated with the second partition.

10. The system of claim 9, wherein the receipt of the first information at the virtual service provider results in a single transition between the first partition and the second partition.

11. The system of claim 8, wherein the first information comprises a request for a second information from the second partition, and wherein the second information is copied directly from the second partition to a second component associated with the first partition.

12. The system of claim 1, wherein the virtual service client and the virtual service provider each comprise respective software instructions for performing at least one of the following: routing information within a partition and routing information between partitions.

13. A method for communicating in a virtual environment operating on a computing device comprising a processor capable of performing the steps of:
    receiving information at a virtual service client that is implemented at a first position in a first partition operational on the computing device; wherein the first partition comprises a first software stack comprising a first storage stack wherein the first position is above a first storage port component in the first software stack;
    determining whether the information is to be routed through the first component in the first software stack to a virtual service provider that is implemented at a second position in a second partition wherein the second position is above a second storage port component in a second storage stack;
    routing the information to the virtual service provider in the second partition by circumventing the first component in the first software stack;
    wherein the first position and the second position enable the virtual service client and the virtual service provider, respectively, to reduce processing overhead associated with communicating in the virtual environment.

14. The method of claim 13, wherein the information received at the virtual service provider comprises a single information packet.

15. The method of claim 13, wherein the first software stack also comprises a first network stack and the second software stack also comprises a second network stack, respectively, wherein the first position is above a first TCP component in the first network stack, and wherein the second position is also above a second TCP component in the second network stack.

16. A method for communicating in a virtual environment operating on a computing device comprising a processor capable of performing the steps of:

receiving first information at a virtual service client that is implemented at a first position in a first partition operational on the computing device, wherein the first information comprises a request for second information from a second partition wherein the first partition comprises a first software stack comprising a first storage stack wherein the first position is above the first component in the first storage stack;

determining whether the first information is to be routed through the first component in the first software stack to a virtual service provider implemented at a second position above a first component in a second storage stack in the second partition;

routing the first information to the virtual service provider in the second partition by circumventing the first component in the first software stack; and copying the second information directly from the second partition to a component associated with the first partition; wherein the first position and the second position enable the virtual service client and the virtual service provider, respectively, to reduce processing overhead associated with operating in the virtual environment.

17. The method of claim 16, wherein the first partition and the second partition further comprise a first network stack and a second network stack, respectively, wherein the first position is also above a first TCP component in the first network stack, and wherein the second position is above a second TCP component in the second network stack.

* * * * *